United States Patent
Mottine, Jr. et al.

(10) Patent No.: US 6,392,152 B1
(45) Date of Patent: May 21, 2002

(54) PLENUM CABLE

(75) Inventors: John Joseph Mottine, Jr.; Kenneth Scott Koehler, both of Phoenix; Sayed John Mirkazemi, Peoria; Richard Stephen Cuprak, Jr., Tempe; Gabriel Pasquale Pellicciotti, Phoenix, all of AZ (US); Todd Alan Rhoades, Rancho Murieta, CA (US)

(73) Assignee: Belden Communications, Phoenix, AZ (US)

( * ) Notice: Subject to any disclaimer, the term of this patent is extended or adjusted under 35 U.S.C. 154(b) by 0 days.

(21) Appl. No.: 08/640,262

(22) Filed: Apr. 30, 1996

(51) Int. Cl.[7] ................................................. H01B 7/00
(52) U.S. Cl. ............................. 174/110 PM; 174/113 R
(58) Field of Search .................... 174/110 PM, 110 FC, 174/110 F, 113 R, 120 R, 121 A

(56) References Cited

U.S. PATENT DOCUMENTS

| | | | |
|---|---|---|---|
| 3,516,859 A | * | 6/1970 | Gerland et al. ......... 427/118 X |
| 3,692,924 A | * | 9/1972 | Nye ....................... 174/120 R |
| 4,412,094 A | * | 10/1983 | Dougherty et al. ...... 174/110 F |
| 4,605,818 A | * | 8/1986 | Arroyo et al. .......... 174/107 X |
| 4,781,433 A | | 11/1988 | Arroyo et al. ........... 350/96.23 |
| 4,804,702 A | | 2/1989 | Bartoszek ................... 524/432 |
| 4,881,794 A | | 11/1989 | Bartoszek ................. 350/96.23 |
| 4,969,706 A | | 11/1990 | Hardin et al. ............. 350/96.23 |
| 5,173,960 A | * | 12/1992 | Dickinson ............... 385/100 X |
| 5,268,531 A | | 12/1993 | Nguyen et al. ................ 174/36 |
| 5,276,759 A | | 1/1994 | Nguyen et al. ............. 385/114 |
| 5,563,377 A | * | 10/1996 | Arpin et al. ............ 174/121 A |
| 5,600,097 A | * | 2/1997 | Bleich et al. ........ 174/110 R X |

* cited by examiner

Primary Examiner—Chau N. Nguyen
(74) Attorney, Agent, or Firm—Snell & Wilmer LLP

(57) ABSTRACT

A communications cable having superior electrical characteristics and meeting the burn requirements for plenum applications has a core formed of one or more twisted wire pairs having primary insulation formed of a suitable material, such as high density polyethylene. The core is surrounded by an inner jacket formed of a low smoke, polyvinyl chloride material. As an alternative to or in addition to the inner jacket, the core may be surrounded by a core wrap having adequate electrical properties and burn/flame resistance properties. The inner jacket is surrounded by an outer jacket formed from a material having excellent heat/flame resistance characteristics but which may have less than optimal electrical characteristics, such as a thermoplastic halogenated polymer, for example polyvinylidine fluoride material. A plurality of cores surrounded by individual inner core wraps and/or inner jackets may be surrounded by the outer jacket.

16 Claims, 1 Drawing Sheet

PLENUM CABLE

FIELD OF THE INVENTION

This invention relates to a communications cable suitable for plenum, riser, and other applications in building structures and, more particularly, relates to an improved construction for such a cable which is capable of meeting burn requirements while at the same time being able to transmit high frequency signals in a local area network.

BACKGROUND OF THE INVENTION

It is common practice to route communication cables and the like for computers, data devices, and alarm systems through plenums in building constructions. If a fire occurs in a building which includes plenums or risers, however, the non-fire retardant plenum construction would enable the fire to spread very rapidly throughout the entire building. Fire could travel along cables installed in the plenum, and smoke originating in the plenum could be conveyed to adjacent areas of the building.

A non-plenum rated cable sheath system, which encloses a core of insulated copper conductors, and which comprises only a conventional plastic jacket, may not exhibit acceptable flame spread and smoke generation properties. As the temperature in such a cable rises due to a fire, charring of the jacket material may occur. If the jacket ruptures, the interior of the jacket and the insulation are exposed to elevated temperatures. Flammable gases can be generated, propagating flame and generating smoke.

Generally, the National Electrical Code requires that power-limited cables in plenums be enclosed in metal conduits. This is obviously a very expensive construction due to the cost of materials and labor involved in running conduit or the like through plenums. The National Electrical Code does, however, permit certain exceptions to the requirements so long as such cables for plenum use are tested and approved by an independent testing laboratory, such as the Underwriters Laboratory, as having suitably low flame spread and smoke-producing characteristics. The flame spread and smoke production characteristics of cable are measured per specification UL-910 plenum burn analysis.

With plenum cables, in addition to concerns about flammability and smoke production, the cables must also, of course, have suitable electrical characteristics for the signals intended to be carried by the cables. There are various categories of cable, such as Category 3, Category 4, Category 5, etc., with increasing numbers referring to enhanced or higher frequency electrical transmission capabilities. With Category 5, for example, extremely good electrical parameters are required, including low attenuation, structural return loss, and cross-talk values for frequencies up to 100 MHz. Unfortunately, cable materials which generally have the requisite resistance to flammability and smoke production also result in electrical parameters for the cable generally not suitable for the higher transmission rates, such as a Category 5 cable. Specifically, in the case of cables intended for Category 5, the cable core, in addition to passing the plenum burn test UL-910, must also pass physical property testing provided by the specification requirements UL-444, as well as meet Category 5 electrical requirements such as provided in Electronic Industries Association specification TIA-568A.

Currently, a cable construction which is available and which meets these requirements is provided in a configuration which includes fluorinated ethylene propylene (FEP) as insulation, with a low smoke (LS) polyvinyl chloride (PVC) jacket. Such a cable construction meets the 100 MHz frequency operation requirements, and it has been demonstrated that such a cable construction can be suitable for operation at 155 Megabits or 150 MHz. Unfortunately, FEP is in short supply. Given the manufacturing capacity of FEP producers, only enough FEP is currently produced to meet approximately 50% of the demand for the volume of material required to construct high-category cables. Although it could be expected that the supply of FEP will continue to increase, it is apparent that the available quantity of FEP may not meet the demand for the material for use in plenum cables as the market is projected to increase at a rate of 30% per year through 1999.

Current riser cables utilize a foam/skin insulation (referred to hereafter as "F/S"). The insulation material construction is a foamed, high density polyethylene (HDPE)/polyvinyl chloride (PVC) skin composite. A jacketed and shielded cable of these insulation cores meets Category 3 electrical and the CMR burn requirements. However, developing a Category 5 cable is very difficult due to the extreme electrical parameters necessary; i.e., attenuation, structural return loss, and cross-talk values to 100 Mhz. Furthermore, this core must pass elevated temperature attenuation requirements at 40° C. and 60° C. The above-mentioned insulation composite with a PVC skin will not pass the elevated temperature attenuation requirements because the dielectric constant of PVC increases with temperature.

OBJECTS AND SUMMARY OF THE INVENTION

It is an object of this invention to provide a cable construction suitable for high frequency electrical applications while at the same time being resistant to burning.

It is a more specific object of this invention to provide a cable design that meets Category 5 or higher electrical parameters, including elevated temperature attenuation requirements, while at the same time satisfying the burn rating standards for plenum cable.

It is an additional object of this invention to provide a cable construction which meets the electrical and burn rating requirements and additionally meets various physical requirements such as cold bend, room temperature and aged tensile strength, elongation, and the like, required for plenum cables.

It is another object of this invention to provide such a cable construction meeting the above requirements, which does not utilize fluorinated ethylene propylene material (FEP), and which is suitable for operation up to 155 Megabits or 150 MHz.

It is an additional specific objective of this invention to provide a novel material for a core wrap wherein the core wrap meets burn requirements without additional burn protection jackets or layers.

Briefly, in accordance with one embodiment of the invention, a riser and plenum rated cable construction includes a plurality of twisted wire pairs utilizing a polyolefin primary insulation material, an outer jacket for the cable construction formed of a thermoplastic halogenated polymer, and a inner jacket or core wrap separating the twisted wire pairs from the halogenated polymer.

DETAILED DESCRIPTION

Figure 1:
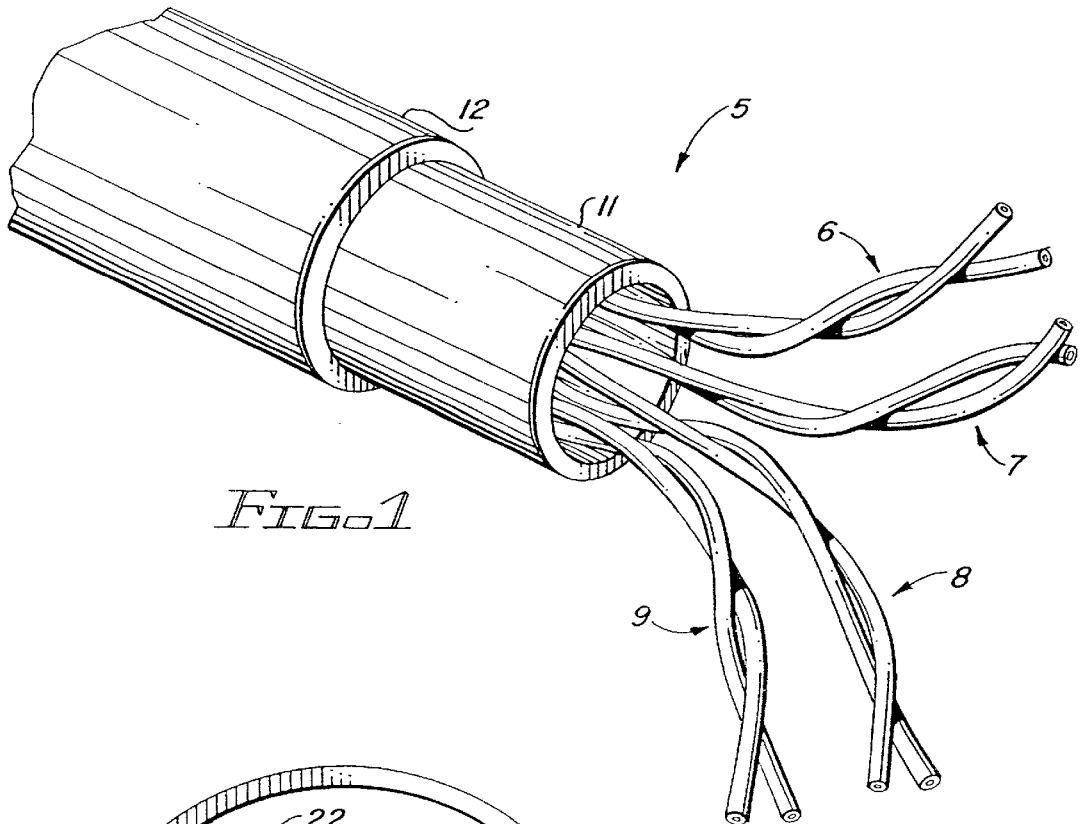
FIG. 1 is an elevation of a cable construction in accordance with the present invention with portions of the inner and outer jackets broken away for illustrative purposes.

As noted, fluorinated ethylene propylene (FEP) insulation with a low-smoke polyvinyl chloride jacket meets Category 5 electrical requirements and the applicable physical and burn property tests for plenum rated cable. The TIA/EIA 568-A Standard sets forth the electrical requirements for Category 5 cable. In addition to other criteria, Category 5 cable must meet or exceed certain attenuation, return loss, and crosstalk requirements. For example, Category 5 cable must be configured such that any given conductor pair has an attenuation, in a frequency range of f=0.772 MHz to f=100 MHz, determined by the formula:

$$ATTN(f) \leq 1.967 \sqrt{f} + 0.023 f + 0.050/\sqrt{f}.$$

In addition, Category 5 cable must be configured such that any given conductor pair has a structural return loss (SRL) in decibels, within a frequency range of f=20 MHz to f=100 MHz, determined by the formula:

$$SRL(f) \geq 23 - 10 \log(f/20).$$

If the cable does not meet these (and other) performance criteria, then it may not be properly classified as Category 5 cable. While the electrical and physical property requirements for Category 5 and higher cable could be met with other plastics such as polyolefins or modified polyolefins, the plenum burn requirements, such as UL-910, could not be met since polyolef ins burn readily. If a polyolef in material was smoke suppressed and flame retarded, the ingredients necessary for flame protection would detract from the necessary electrical values of the polyolefin material, and would also detract from the physical property attributes of the material.

The CMP or plenum burn test is a severe test. The test takes place in a closed horizontal fixture or tunnel, with the ignition flame source being a 300,000 BTU/hour methane flame with a high heat flux, and a 240-foot/minute air draft. The test lasts 20 minutes, and the cable is stretched side to side across a 12-inch wire mesh rack in the tunnel. To pass this test, flame spread must not exceed five feet after the initial 4.5-foot flame source; smoke generation must not exceed a peak optical density of 0.5 (33% light transmission); and the average optical density must not exceed 0.15 (70% light transmission). The purpose of this optical smoke density parameter is to allow a person trapped in a fire the ability to see exit signs as well as visually discern a route or means of escape.

FIG. 1 shows an elevation of a cable construction in accordance with this invention for providing a cable meeting Category 5 electrical requirements and the applicable burn and smoke generation requirements, as well as the physical property requirements, for plenum-rated cable without the use of FEP. Referring now to FIG. 1, there is shown a cable which is designated generally by the reference numeral 5, which is suitable for use in building plenums and the like. In the specific example shown in FIG. 1, the cable 5 is illustrated as having four twisted pair of transmission media, referred to as twisted pairs and indicated by reference numerals 6, 7, 8 and 9, forming what is generally referred to as the cable core. In accordance with this embodiment of the invention, the twisted pairs 6 through 10 have a polyolefin primary insulation, which has good electrical characteristics even though it readily burns. In a specific embodiment of the present invention, a foam/skin high density polyethylene (HDPE) is used for the primary insulation, which has the requisite electrical characteristics for high frequency cable applications.

In order to enable having the required resistance to burning, the cable construction in accordance with this invention is provided with an outer jacket 12 which is highly resistant to burning. Thermoplastic halogenated polymers have been found to be suitable materials, particularly thermoplastic fluorocarbon polymers. In a specific embodiment of the invention, polyvinylidene fluoride (referred to hereafter as "PVDF") has been found to be quite suitable in terms of providing adequate flame and burn resistance to meet the applicable standards.

A cable construction consisting of only the core or twisted pairs with polyolefin insulation surrounded by a jacket of thermoplastic fluorocarbon polymer meets the applicable burn standards, but does not meet the high frequency electrical standards for cable. Specifically, the less than optimal electrical characteristics of this fluorocarbon polymer, and its proximity to the twisted pairs degrade the cable's electrical characteristics.

In accordance with the present invention, it has been found that providing an intermediate material between the cable core and fluorocarbon polymer isolates the core from the outer jacket sufficiently to greatly improve the electrical characteristics of the cable. The intermediate material should be selected from materials having high temperature stability and reasonably satisfactory electrical characteristics at high frequencies. In one embodiment, a low smoke polyvinyl chloride (LS-PVC) inner jacket 11 is provided surrounding the core and separating the core from the outer jacket. As discussed hereafter, in addition to or in place of the inner jacket a core wrap can be used made of a material as discussed hereafter.

Figure 2:
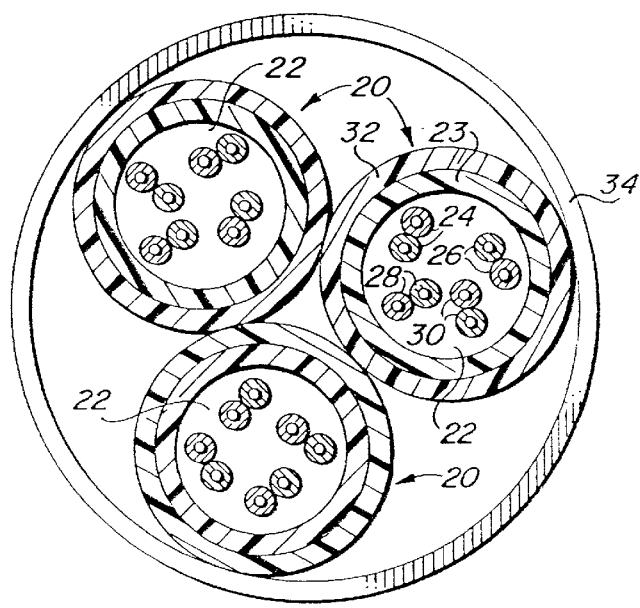
FIG. 2 is a cross sectional view of a cable construction in accordance with the present invention in which a plurality of cables having inner jackets are enclosed as a composite in an outer jacket.

Referring now to FIG. 2, there is shown a construction of a cable in accordance with this invention, suitable for use in building plenums, and the like, i.e., indoor/outdoor rated cable, in which a plurality of inner jacketed cables are enclosed within a single outer jacket. In FIG. 2, the cable 10 comprises one or more cables 20, each of which includes a core 22. The core 22 may be one which is suitable for use in data, computer, alarm, and other signalling networks as well as communications. The core 22 is the transmission medium and is shown in FIG. 2 as comprising one or more twisted wire pairs, the pairs of which are referred to in FIG. 2 by reference numerals 24, 26, 28 and 30. Cables which are used in plenums may include 25 or more conductor pairs, although some cables include as few as six, four, two or even a single conductor pair such as shown in FIG. 1. In the exemplary embodiment shown in FIG. 2, each of the cores 22 comprise four twisted conductor pairs, identified in FIG. 2 with reference numerals 24, 26, 28 and 30.

As shown in FIG. 2, each of the cables 20 has an inner jacket 32 surrounding the twisted wire pairs contained therein. As also shown in FIG. 2, each core may also have a core wrap identified by reference numeral 23. The core wrap is discussed more fully hereafter, and in some embodiments, only the core wrap may be provided instead of the inner jacket 32. In other embodiments, both the core wrap and inner jacket are provided as well as an outer jacket.

As also shown in FIG. 2, a plurality of the cables 20 are disposed within an outer jacket 34 in this embodiment. In FIG. 1, three cables 20 are shown as enclosed in an outer jacket 34, although the invention is equally applicable to there only being one cable enclosed by an outer jacket (as shown in FIG. 1) and for there being more or less than three cables 20 disposed within the outer jacket 34.

Figure 3:
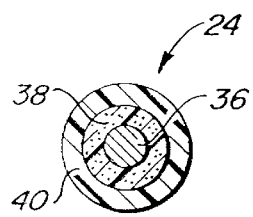
FIG. 3 is a cross-section of one of the conductors in a twisted wire pair of the cable shown in FIG. 2.

FIG. 3 is a cross-section of one of the conductors in one of the twisted pairs, such as twisted pair 24. The conductor or transmission medium 24 includes a conductor 36 surrounded by an insulating material 38. The insulating material 38 may have a skin portion indicated by reference numeral 40.

In accordance with a preferred embodiment of the invention, the primary insulation 38 surrounding conductor 36 in each wire in the twisted wire pairs, such as wire pair 24, is a foam/skin polyolefin dual extruded insulation, which is acceptable for Category 5 electrical characteristics. The reasons for using a foam/skin insulation such as foam 38 with skin 40 (FIG. 3), in addition to achieving improved electrical properties, is to effectively decrease the amount of polyolefin material available to burn. It is important to keep the foam/skin pure, with no fillers, such that this insulation can match or exceed the electrical properties of fluorinated ethylene propylene (FEP). For example, FEP has a dielectric constant of 2.1, with a dissipation factor of 0.0001; in accordance with a specific embodiment of the invention described herein, insulation 38/40 is a pure foam/skin high density polyethylene having a dielectric constant of 1.8, with an equivalent dissipation factor of 0.0001. With this configuration, the velocity of propagation is even improved with the foam/skin at 71.5% as opposed to 68% for FEP. By comparison, a flame retardant polyolefin with fillers would have a velocity of propagation of 62%. Also, a 2×2 cable (two pairs of flame retardant polyolefins plus two pairs of FEP) would encounter velocity of propagation skew problems, which is the difference in the distribution of electrical flow between the two insulation types. There are no skew problems with the pure foam/skin high density polyethylene. Velocity of propagation considerations and skew factors are discussed more fully hereafter.

In accordance with one specific embodiment of the present invention, the primary insulation 38/40 is dual extruded, with foam insulation 38 being a high-density polyethylene. A suitable material is one produced and available from Union Carbide Corporation identified as DGDB-1351NT, although an equivalent suitable for mechanical foaming may be used. In accordance with the specific embodiment of the invention, the skin portion 40 of wire 24 is also a high-density polyethylene produced by Union Carbide Corporation and available therefrom and identified as DGDM-3364 NT. In such an insulation construction, the polyolefin skin 40 has to be of adequate thickness to protect the overall foam/skin primary insulation from crushing during twist. The degree of foaming, the foam thickness, and the skin thickness are dependent upon compliance with UL-444 physical property testing requirements.

In accordance with a specific embodiment of the invention, the conductor 36 in each wire 24 had a diameter range from 0.0194 inches to 0.0215 inches. In accordance with this specific embodiment, the foam 38 had a thickness of 0.0055 inches, and the skin 40 had a thickness of 0.0025 inches.

In accordance with one embodiment of this invention, each of the cables 20 is provided with a core wrap 23 surrounding the conductor pairs, with the inner jacket 32 surrounding the core wrap. The core wrap 23 should be selected from materials which have reasonable electrical characteristics and which are burn and/or flame resistant. Specifically, core wrap 23, in addition to protecting the polyolefin primary insulation from smoke generation and flame spread, must also possess adequate electrical values. It has been found that suitable materials for core wrap 23 are the polyamides, the polyimides, and modified polyimides. In a specific embodiment of the invention a class of polyimide films known as KAPTON, produced by and available from E. I. DuPont de Nemours Co., were found to be suitable. While KAPTON 100–500 HN types are quite suitable for the core wrap, KAPTON 100–300 MT type was found to function best.

Specific alternate materials to the KAPTON for the core wrap include a polyetherimide film known as ULTEM produced by and available from General Electric and a polyamide or aramid material such as that known by the trademark NOMEX. While in accordance with the principles of this invention the core wrap 23 can be wrapped helically or longitudinally, longitudinally is preferred.

Specific materials which have been utilized in tests of the cable construction in accordance with this invention, and which are suitable for use in this invention, are discussed below.

As previously mentioned, preferably the primary insulation of the transmission media is a foamed/skin construction of high density polyethylene. One material which was found to be quite suitable in accordance with the invention is a polyethylene material known as DGDB-1351NT, and available under that designation from Union Carbide. When this material is foamed and dual extruded with a skin, DGDM 3364 NT also produced by Union Carbide Corporation, it has a dielectric constant at 1 MHz of 1.80, a dissipation factor at 1 MHz of 0.0001, and an LOI of 17%. LOI refers to the limiting oxygen index, the percent of oxygen in air at which the sample burns completely. The specific gravity of this material is 0.945, but this material does not char, and hence needs to be protected by additional materials to meet the burn test, in accordance with and as provided by this invention.

A suitable material for the inner jacket material 11 or 32 of a cable construction in accordance with this invention is a low-smoke, polyvinyl chloride material known as SmokeGuard 6920 F1 LS-PVC, and available from AlphaGary Corporation. This material has a dielectric constant at 1 MHz of 4.20, a dissipation factor at 1 MHz of 0.0384, and an LOI of 48%. The specific gravity of this material is 1.66, and it has excellent char formation.

Another suitable material for an inner jacket construction in accordance with this invention, are polyvinyl chloride formulations known as GTP-45 and GTP-36, produced by Gitto Global Corporation. The GTP-45-CSI material has a dielectric constant at 1 MHz of 3.60, a dissipation factor at 1 MHz of 0.017, and an LOI of 52%. The specific gravity of this material is 1.65, and it exhibits excellent char formation.

As described above, the outer jacket 12 or 34 in accordance with this invention is made of a halogenated polymer, and can be a polyvinylidene fluoride (PVDF) material. One polyvinylidene fluoride material which has proved to be extremely suitable is a polyvinyldiene fluoride known as SOLEF 31508-0009, available from Solvay. This material has a dielectric constant of 8.40 at 1 MHz, a dissipation factor of 0.1850 at 1 MHz, and an LOI of 100% (the ideal LOI). The specific gravity of the material is 1.78, and it exhibits excellent char formation.

Another suitable outer jacket material is a polyvinyldine fluoride alloy known as SOLEF 70109-X003, an alloy also available from Solvay. The dielectric constant of this material at 1 MHz is 5.20, the dissipation factor at 1 MHz is 0.1250, and the LOI is 85%. The specific gravity of this material is 1.64, and its char formation is excellent.

As previously described, in accordance with one aspect of the invention the core can be wrapped with a core wrap material with no inner jacket, with only an outer jacket being provided. Alternatively, the core can be wrapped with the core wrap and enclosed in both an inner jacket and an outer jacket. Suitable core wrap materials discussed above are the polyamides, the polyimides, and modified polyimides. A particularly suitable core wrap material is a polyimide film known as KAPTON HN series available from E.I.DuPont de Demours Co. This material has a dielectric constant at 1 MHz of 3.20, a dissipation factor at 1 MHz of 0.0585, and an excellent LOI of 100%. It also has excellent char characteristics.

Acceptable alternative specific core wrap materials include another polyimide film series known as KAPTON MT series available from E.I.DuPont de Demours Co. These particular materials have a dielectric constant at 1 MHz of 3.50, a dissipation factor at 1 MHz of 0.0395, and an excellent LOI of 100%. Char characteristics are also excellent.

Acceptable additional alternative specific core wrap materials include a polyetherimide film known as ULTEM 5000 available from the General Electric Co., and an aramid material know as NOMEX. These materials have poorer burn characteristics than KAPTON, however.

It has been found that the KAPTON materials described above, with their excellent LOI characteristics, are useful in a cable construction in which a core having polyethylene primary insulation is wrapped with a KAPTON core wrap of between one and five mils in thickness, and then an outer jacket of polyvinyl chloride provided. While not as burn and flame resistant as such a construction which also includes an outer jacket of a thermoplastic halogenated polymer, the construction is nevertheless useful in some applications. In fact, such a construction has proved to be capable of passing the UL-910 burn testing specification.

A number of experimental cables were fabricated utilizing the materials set forth previously for insulation construction and inner and outer cable jackets. The experimental cables which passed the UL-910 plenum burn test at an independent laboratory in terms of construction, with dimensions given in mils, are as follows:

| Insulation Construction | Inner Jacket | Outer Jacket | Burn UL-910 Analysis | | |
|---|---|---|---|---|---|
| | | | Peak OD | Avg OD | FL SP |
| F/S (4.5/2.5) | 14 LS-PVC GPT-35 | 24–27 | 0.29–0.42 | 0.04–0.07 (3 BURNS) | 3.6–4.4' |
| F/S (4.5/2.5) | 12 LS-PVC GPT-35 | 26–27 PVDF | 0.29–0.37 | 0.04–0.05 (3 BURNS) | 3.7–3.9' |
| F/S (5.5/2.5) | 16 LS-PVC GPT-45 CSI | 25 PVDF | 0.20–0.31 | 0.07–0.08 (2 BURNS) | 3.5' |
| F/S (5.5/2.5) | 20 LS-PVC GPT-45 CS | 25 PVDF | 0.19–0.22 | 0.07–0.09 (2 BURNS) | 3–4' |

All of the above listed cables passed the plenum burn test as indicated, and also passed the Category 5 electrical requirements, as well as the UL-444 physical property test requirements.

Although an initial objective in accordance with the present invention focused on developing a cable construction that met the performance of existing cable using FEP insulation, it has been unexpectedly found that cable constructed in accordance with the principles of this invention actually exceeds the performance of FEP insulated cable. In the prior art, in addition to cables utilizing, for example, four twisted pair, all having FEP insulation, there have been constructions using a combination of insulation materials. These combination insulation constructions have been aimed at dealing with the shortage of FEP material relative to the demand for high category cables. For example, one prior art construction utilized a cable containing three twisted pair of FEP insulated conductors with one twisted pair of olefin insulated conductors. Another prior art construction utilized a cable containing two twisted pair of FEP insulated conductors, and two twisted pair of olefin conductors.

In all cables intended for high frequency transmission applications, the velocity of signal propagation (which should be as high as possible) is extremely important, as is the allowable skew. Skew refers to variations among twisted pair in a single cable of the velocity of propagation or other characteristics, and should be as small as possible to minimize data distortion. The following table represents the results of measurements of characteristics of 4 pair FEP, 3 pair FEP+1 pair olefin, 2 pair FEP+2 pair olefin, and 4 pair foam/skin HDPE in accordance with the present invention. In the following table, the velocity of propagation is expressed in % of the speed of light, and the delay is expressed in nanoseconds over a 100 meter cable run. The skew % is determined by the ratio between the worst twisted pair characteristics and the best twisted pair characteristics. The references to BRN, GRN, BLU and ORN, are simply references to particular colors of twisted pair in a standard 4 twisted pair color standard.

| Cable Conf. | Insulation | Color | Dielectric Cons. | Vel.Prop | Delay |
|---|---|---|---|---|---|
| 4 pr. FEP | | | | | |
| | FEP | BRN | 1.74 | 75.80% | 1.35 ns |
| | FEP | GRN | 1.76 | 75.40 | 1.36 |
| | FEP | BLU | 1.81 | 74.30 | 1.36 |
| | FEP | ORN | 1.83 | 73.90 | 1.39 |
| | | Average | 1.79 | 74.90 | 1.37 |
| | | Skew | 5.20% | 2.80% | 3.00% |
| 3 pr. FEP 1 pr. Olefin | | | | | |
| | Olefin | BRN | 1.99 | 70.90 | 1.43 |
| | FEP | GRN | 1.84 | 73.70 | 1.37 |
| | FEP | BLU | 1.90 | 72.50 | 1.39 |
| | FEP | ORN | 1.92 | 72.20 | 1.40 |
| | | Average | 1.91 | 72.30 | 1.40 |
| | | Skew | 8.20% | 3.10% | 4.40% |
| 2 pr. FEP 2 pr. Olefin | | | | | |
| | Olefin | BRN | 2.20 | 67.40 | 1.52 |
| | FEP | GRN | 1.79 | 74.70 | 1.38 |
| | FEP | BLU | 1.79 | 74.70 | 1.38 |
| | Olefin | ORN | 2.20 | 67.40 | 1.52 |
| | | Average | 2.00 | 71.05 | 1.45 |
| | | Skew | 22.90% | 10.80% | 10.10% |
| 4 pr. F/S in accordance with the invention | | | | | |
| | F/S | BRN | 1.59 | 79.20 | 1.30 |
| | F/S | GRN | 1.61 | 78.80 | 1.31 |
| | F/S | BLU | 1.64 | 77.90 | 1.32 |
| | F/S | ORN | 1.66 | 77.50 | 1.33 |
| | | Average | 1.63 | 78.35 | 1.32 |
| | | Skew | 4.40% | 2.20% | 2.30% |

As shown by the above table, the dielectric constant, velocity of propagation, and delay time, for cable constructed in accordance with the present invention, are all significantly better than FEP only insulated cable, and vastly superior to those for composite FEP/Olefin insulated cables. The skew for the cable of this invention is also significantly better than for FEP insulated cable. Such a cable construction is indeed suitable for operation at signal frequencies of 150 MHz or 155 Megabits.

In accordance with the present invention, an improved cable construction is achieved, which is a result of a novel combination of electrical and burn properties of materials. Specifically, primary insulation of polyolefin, which in a specific example is foamed, such as a high-density polyethylene (HDPE) surrounded by a HDPE skin, is surrounded by a jacket of thermoplastic halogenated polymer, which in a specific example is polyvinylidine fluoride (PVDF) material. In accordance with the invention, an intermediate material is provided in the cable construction separating the polyolefin primary insulation from the halogenated polymer jacket. Specifically, a core wrap and/or inner cable jacket material is utilized for the intermediate material. A suitable inner jacket material is a material having high temperature stability and reasonable electrical characteristics, such as a low-smoke, polyvinyl chloride. A core wrap material which may be included is suitably selected from the polyimides, modified polymides, and the polyamides.

Although the specific examples discussed herein have, for purposes of completeness, included identification of specific suitable materials available from various manufacturers, equivalent materials available now or hereafter can obviously be substituted with satisfactory results. It is intended, therefore, in the appended claims, to cover not only the specific materials and constructions which have been discussed herein, but also substitution of equivalent materials in the overall cable construction.

What is claimed is:

1. A communications cable for use in building plenum applications, said cable comprising:
    a core which comprises at least one transmission medium, each of said at least one transmission medium being enclosed by a primary insulation formed from substantially pure high density polyethylene;
    an outer jacket surrounding said core and formed from a polyvinylidene fluoride (PVDF) composition; and
    an intermediate material interposed between said core and said outer jacket, said intermediate material having high temperature stability and being configured to electrically separate said core from said outer jacket; wherein
    said primary insulation, said outer jacket, and said intermediate material are formed and cooperatively configured such that said cable passes a standard plenum cable burn test and said cable meets the Category 5 electrical requirements of TIA/EIA Standard 568A.

2. The communications cable of claim 1, wherein said at least one transmission medium comprises a twisted wire pair having two conductors, and in which each of said conductors is individually enclosed by a respective primary insulation formed from substantially pure high density polyethylene.

3. The communications cable of claim 1, wherein said high density polyethylene primary insulation is a foamed/skin composite construction.

4. The communications cable of claim 1, wherein said intermediate material comprises an inner jacket.

5. The communications cable of claim 4, wherein said inner jacket is made of low smoke, polyvinyl chloride.

6. The communications cable of claim 1, wherein said intermediate material comprises a core wrap.

7. The communications cable of claim 6, wherein said core wrap is formed of a material selected from the group consisting of a polyimide, a polyamide, and a modified polyimide.

8. The communications cable of claim 6, wherein said intermediate material comprises both said core wrap and an inner jacket.

9. The communications cable of claim 8, wherein said core wrap is made of a material selected from the group consisting of a polyimide, a polyamide, and a modified polyimide, and said inner jacket is made of low smoke polyvinyl chloride.

10. The communications cable of claim 1, wherein:
    said intermediate material comprises an inner jacket surrounding said core;
    said cable further comprises an additional plurality of cores similar to said core, each of said additional plurality of cores being individually surrounded by a respective inner jacket similar to said inner jacket; and
    said outer jacket surrounds said plurality of cores.

11. The communications cable of claim 10, wherein said inner jacket and each of said respective inner jackets are made of low smoke polyvinyl chloride.

12. A communications cable for use in building plenum applications, said cable comprising:
    a twisted pair having two conductors, each conductor being enclosed by a substantially pure polyolefin primary insulation;
    an outer jacket surrounding said twisted pair, said outer jacket being formed from a substantially pure polyvinylidene fluoride (PVDF) composition; and
    an inner jacket interposed between said twisted pair and said outer jacket, said inner jacket being formed from a low-smoke polyvinyl chloride (PVC) composition; wherein
    said primary insulation, said outer jacket, and said inner jacket are formed and cooperatively configured such that said twisted pair has an attenuation, in a frequency range of f=0.772 MHz to f=100 MHz, determined by a formula $$\text{ATTN}(f) \leq 1.967\ \text{sqrt}(f) + 0.023\ f + 0.050/\text{sqrt}(f);\ \text{and}$$

said primary insulation, said outer jacket, and said inner jacket are formed and cooperatively configured such that said twisted pair passes the flame spread and smoke generation requirements of the UL-910 Steiner Tunnel Test.

13. The communications cable of claim 12, wherein said inner jacket has high temperature stability and is configured to electrically separate said twisted pair from said outer jacket.

14. The communications cable of claim 12, wherein said primary insulation, said outer jacket, and said inner jacket are formed and cooperatively configured such that said twisted pair has a structural return loss (SRL) in decibels, within a frequency range of f=20 MHz to f=100 MHz, determined by a formula $$\text{SRL}(f) \geq 23 - 10\ \log(f/20).$$

15. The communications cable of claim 12, wherein said primary insulation comprises a foam/skin high density polyethylene composition.

16. The communications cable of claim 12, wherein said primary insulation, said outer jacket, and said inner jacket are formed and cooperatively configured such that said twisted pair meets the Category 5 electrical requirements of TIA/BIA Standard 568A.

* * * * *

UNITED STATES PATENT AND TRADEMARK OFFICE
CERTIFICATE OF CORRECTION

PATENT NO.     : 6,392,152 B1
DATED          : May 21, 2002
INVENTOR(S)    : John Joseph Mottine, Jr. et al.

It is certified that error appears in the above-identified patent and that said Letters Patent is hereby corrected as shown below:

<u>Title page,</u>
Item [*] Notice, delete "0" and insert -- 930 --.

Signed and Sealed this

Twenty-third Day of March, 2004

JON W. DUDAS
*Acting Director of the United States Patent and Trademark Office*